US009986118B2

(12) United States Patent
Nishikawa

(10) Patent No.: US 9,986,118 B2
(45) Date of Patent: May 29, 2018

(54) IMAGE FORMING APPARATUS THAT ENSURES REDUCED WASTE OF RECORDING SHEET WHEN PERFORMING TRIAL PRINTING

(71) Applicant: Kyocera Document Solutions Inc., Osaka (JP)

(72) Inventor: Yoshiteru Nishikawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days. days.

(21) Appl. No.: 15/469,587

(22) Filed: Mar. 27, 2017

(65) Prior Publication Data

US 2017/0318176 A1 Nov. 2, 2017

(30) Foreign Application Priority Data

Apr. 27, 2016 (JP) .................. 2016-089774

(51) Int. Cl.
*H04N 1/00* (2006.01)
*G06F 3/12* (2006.01)

(52) U.S. Cl.
CPC ....... *H04N 1/00917* (2013.01); *G06F 3/1207* (2013.01); *G06F 3/1256* (2013.01); *H04N 1/0032* (2013.01); *H04N 1/0044* (2013.01); *H04N 1/00411* (2013.01); *H04N 1/00466* (2013.01); *H04N 1/00639* (2013.01); *H04N 2201/0094* (2013.01)

(58) Field of Classification Search
None
See application file for complete search history.

(56) References Cited

U.S. PATENT DOCUMENTS

2007/0009279 A1* 1/2007 Yamauchi .............. G03G 15/55
399/82
2011/0149315 A1* 6/2011 Yamazaki ............ H04N 1/0044
358/1.9

FOREIGN PATENT DOCUMENTS

JP         08087205 A   *  4/1996
JP       H08-087205 A      4/1996
JP       2001-246820 A     9/2001

* cited by examiner

*Primary Examiner* — Andrew H Lam
(74) *Attorney, Agent, or Firm* — James W. Judge

(57) ABSTRACT

An image forming apparatus includes a processor, a storage unit, a paper sheet feeder, an image forming unit, and a postprocessing unit. The postprocessing unit performs postprocessing on the recording sheet following image formation by the image forming unit. When a print/postprocessing job in which a plurality of copies is printed and postprocessing is performed on each copy is executed by the print-job execution unit, the postprocessing-position marking unit labels image data for at least the head page of the first copy with predetermined marks respectively in a position where postprocessing is to be performed and in a position where postprocessing is performable. The print-job execution unit, when executing the print/postprocessing job, performs control such that the first copy is printed without postprocessing, an image in which at least the head page has been labeled with the marks is printed, and the print/postprocessing job is temporarily halted.

10 Claims, 8 Drawing Sheets

IMAGE FORMING APPARATUS THAT ENSURES REDUCED WASTE OF RECORDING SHEET WHEN PERFORMING TRIAL PRINTING

INCORPORATION BY REFERENCE

This application is based upon, and claims the benefit of priority from, corresponding Japanese Patent Application No. 2016-089774 filed in the Japan Patent Office on Apr. 27, 2016, the entire contents of which are incorporated herein by reference.

BACKGROUND

Unless otherwise indicated herein, the description in this section is not prior art to the claims in this application and is not admitted to be prior art by inclusion in this section.

In a printing associated with postprocessing such as staple processing and punch processing, performing staple processing and punch processing at unintended positions not only wastefully consumes a large amount of recording sheets and toners but also generates waste of time and labor associated with a retry of the print job. In view of this, sometimes trial printing is performed first to confirm positions of a staple and a punched hole before immediately performing an ordinary print job.

For example, there is proposed a technique that enables staple processing even on only a single recording sheet to perform trial printing while staple processing is not usually performed on a single recording sheet. There is also proposed a technique that reduces a page in size to perform trial printing, so as to print a staple position in the page on which reduced printing is performed.

SUMMARY

An image forming apparatus according to one aspect of the disclosure includes a processor, a storage unit, a paper sheet feeder, an image forming unit, and a postprocessing unit. The storage unit stores a control program. The paper sheet feeder feeds a recording sheet from a sheet feed cassette. The image forming unit performs image formation on the recording sheet fed from the paper sheet feeder. The postprocessing unit performs postprocessing on the recording sheet following image formation by the image forming unit. By the processor operating in accordance with the control program, the image forming apparatus functions as a control unit, a print-job execution unit, and an postprocessing-position marking unit. The print-job execution unit, in accordance with a print job, performs operational control on the paper sheet feeder, the image forming unit, and the postprocessing unit to cause the paper sheet feeder, the image forming unit, and the postprocessing unit to perform printing. When a print/postprocessing job in which a plurality of copies is printed and postprocessing is performed on each copy is executed by the print-job execution unit, the postprocessing-position marking unit labels image data for at least the head page of the first copy with predetermined marks respectively in a position where postprocessing is to be performed and in a position where postprocessing is performable. The print-job execution unit, when executing the print/postprocessing job, performs control such that the first copy is printed without postprocessing, an image in which at least the head page has been labeled with the marks is printed, and the print/postprocessing job is temporarily halted.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
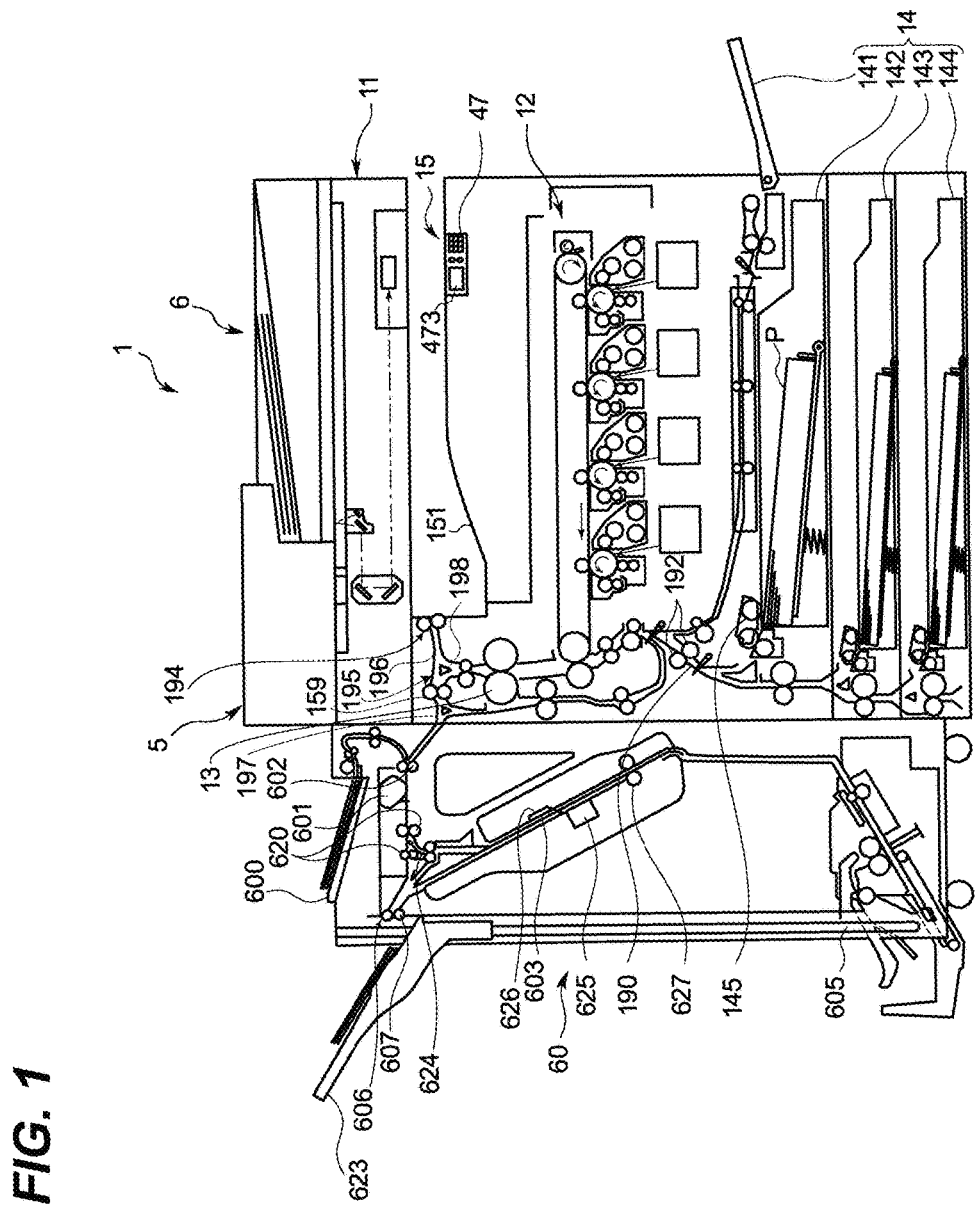
FIG. 1 illustrates a structure of an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an image forming apparatus according to one embodiment of the disclosure with reference to the accompanying drawings. FIG. 1 illustrates a structure of the image forming apparatus according to the one embodiment of the disclosure. An image forming apparatus 1 is a multi-functional peripheral having a plurality of functions such as a copy function, a printer function, a scanner function, and a facsimile function. The image forming apparatus 1 is constituted of an apparatus main body 11, an image forming unit 12, a fixing unit 13, a paper sheet feeder 14, a recording-sheet discharge unit 15, a document conveying unit 6, a document reading unit 5, and similar unit. Further, the image forming apparatus 1 includes a postprocessing device 60. The postprocessing device 60 corresponds to a postprocessing unit that is referred to in the claims.

The image forming unit 12 performs an image forming operation that forms a toner image on a recording sheet P fed from the paper sheet feeder 14. The image-formed recording sheet P is discharged toward a discharge tray 151 by a discharge roller 194.

A conveyance path 190 branches to a first conveyance path 196 heading for the recording-sheet discharge unit 15 and to a second conveyance path 197 heading for the postprocessing device 60. A branch point 195, which is a branch point of the first conveyance path 196 and the second conveyance path 197, includes a switching unit 198 that distributes and guides the recording sheet P, which is conveyed toward the branch point 195, to any one of the first conveyance path 196 or the second conveyance path 197. The switching unit 198 has a distal end portion pointed toward a conveyance-direction upstream side of the recording sheet P. Closing one of conveyance path portions that head for the first conveyance path 196 or the second conveyance path 197 from the conveyance path 190 before the branch by a turn of the distal end portion conveys the recording sheet P toward the first conveyance path 196 or the second conveyance path 197 that connects to the unclosed conveyance path portion.

The image forming apparatus 1 further includes the postprocessing device 60. The postprocessing device 60 includes a platen 600, a punching unit 601, a conveyance roller pair 602, a recording-sheet cradle 603, a conveyance roller pair 620, a discharge roller pair 607, a discharge tray 623, and a conveyance-branch guide 624.

Further, the postprocessing device 60 includes a stapling device 625, a receiving member 626, and a conveyance roller pair 627.

The platen 600 is a tray on which a document, on which a postprocessing is to be performed by the postprocessing device 60, is placed.

The punching unit 601 performs punch processing as one of the postprocessings on a plurality of recording sheets P (including both of a recording sheet after image formation and a document on the platen 600) conveyed from a discharge roller pair 159 of the apparatus main body 11 or from the platen 600.

The recording-sheet cradle 603 temporarily stocks the recording sheet P or the document conveyed from the conveyance roller pairs 602 and 620, as a recording-sheet bundle.

The discharge roller pair 607 is located in a recording-sheet discharge unit 606 to which the recording sheet P is discharged from the postprocessing device 60, and discharges the recording sheet P conveyed from the conveyance roller pairs 602 and 620, and a recording-sheet bundle P1 conveyed from the recording-sheet cradle 603 to the discharge tray 623.

The stapling device 625 performs staple processing as the postprocessing to the recording sheet P conveyed to the recording-sheet cradle 603.

The receiving member 626 receives and holds a lower end of the recording sheet P conveyed to the recording-sheet cradle 603. The conveyance roller pair 627 conveys the recording sheet P or the recording-sheet bundle P1 in a downward direction from the recording-sheet cradle 603.

The recording-sheet cradle 603 includes a driving unit (not illustrated) that moves the receiving member 626 to a conveying-out direction of the recording-sheet bundle P1. Then, the driving of the driving unit corresponding to a control signal from a driving control unit 611 (see FIG. 2) conveys the recording-sheet bundle P1, which has been held at the receiving member 626, up to the discharge roller pair 607, and then discharges the recording-sheet bundle P1 from the recording-sheet discharge unit 606 to the discharge tray 623 by the discharge roller pair 607.

The stapling device 625 is configured to be movable by the driving unit (not illustrated) that is driven by the control signal from the driving control unit 611. When performing ordinary staple processing on the recording sheet P, which is conveyed to the recording-sheet cradle 603, the stapling device 625 is moved to a position close to the end of the recording sheet P and then performs the staple processing close to the end of the recording sheet P. When performing book binding, the stapling device 625 moves close to the center of the recording sheet P and then performs staple processing close to the center of the recording sheet P to perform saddle stitching.

The image forming apparatus 1 ensures settings such as a setting of the postprocessing on the recording sheet P, a setting of performing a book binding process on the recording sheet P after image transfer, and similar setting by inputting of an operation instruction from an operation unit 47 of the image forming apparatus 1 by an operator.

Figure 2:
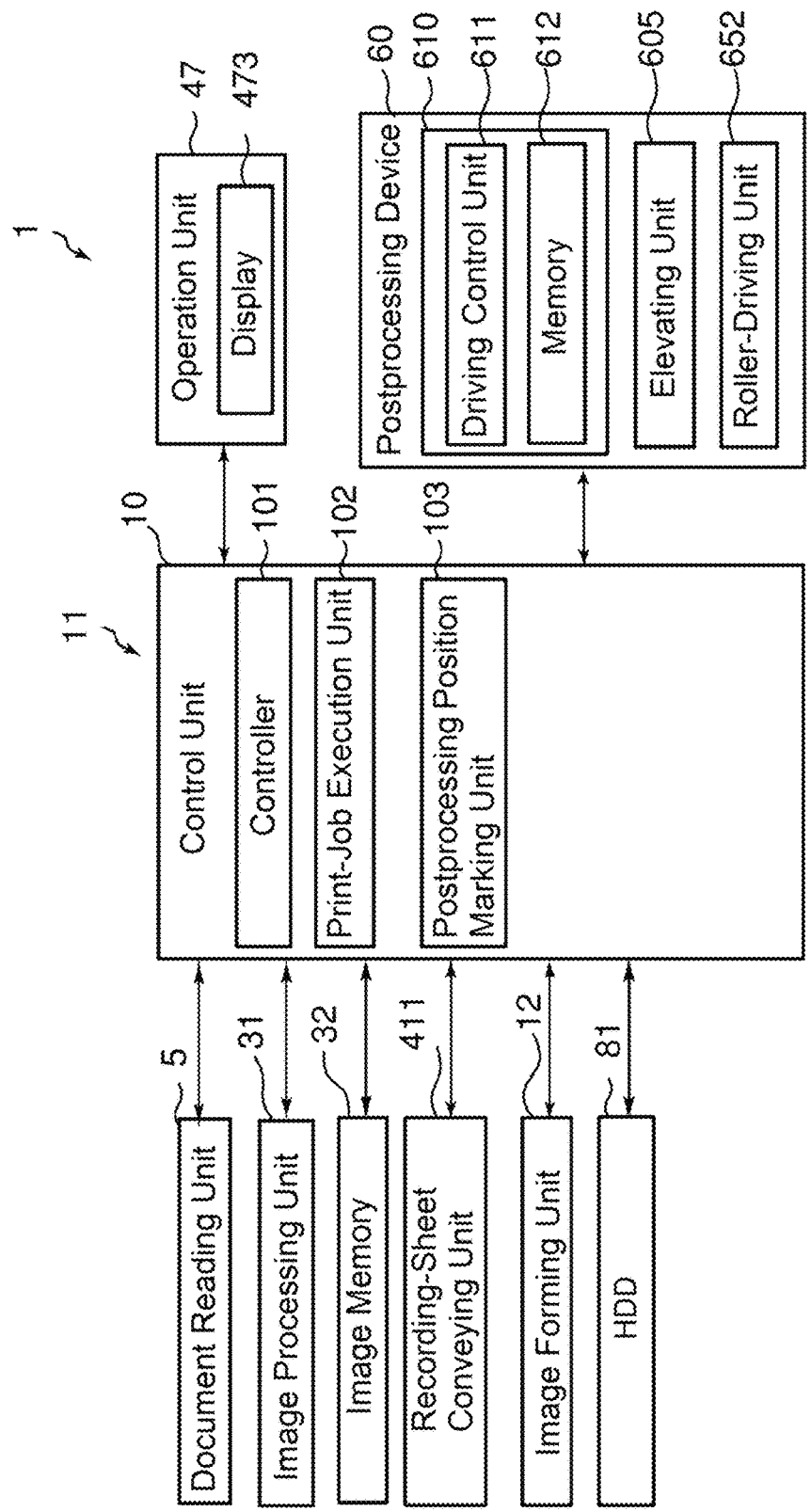
FIG. 2 illustrates a function block diagram indicative of an internal configuration of the image forming apparatus according to the one embodiment.

Next, the following describes an electrical configuration of the image forming apparatus 1 that includes the postprocessing device 60. FIG. 2 illustrates a function block diagram indicative of an internal configuration of the image forming apparatus 1.

The document reading unit 5 irradiates a document with an image-irradiation lamp to receive a reflection light using a CCD sensor, so as to read an image from the document.

An image processing unit 31 performs image processing on image data of the image read by the document reading unit 5, as necessary.

An image memory 32 stores, for example, the image data read by the document reading unit 5.

A recording-sheet conveying unit 411 is constituted of a feed roller 145, a conveyance roller pair 192, and similar roller, which are illustrated in FIG. 1. The recording-sheet conveying unit 411 conveys the recording sheets P, which is housed in a manual bypass tray 141 and sheet feed cassettes 142, 143 and 144, to the image forming unit 12 and up to the discharge roller pair 607 and the recording-sheet discharge unit 606 communicating with the postprocessing device 60. The discharge roller pair 607 and the recording-sheet discharge unit 606 also constitute the recording-sheet conveying unit 411.

The operation unit 47, as also illustrated in FIG. 1 in addition to FIG. 2, accepts an instruction on various kinds of operations and processes that the image forming apparatus 1 can executes from the operator. The operation unit 47 includes a (touch screen) display 473 with a touch panel function.

A control unit 10 is constituted of, for example, a processor, a RAM, a ROM, and a dedicated hardware circuit. The processor is, for example, a central processing unit (CPU), an MPU, an ASIC, or similar electronic component. The control unit 10 includes a controller 101, a print-job execution unit 102, and a postprocessing-position marking unit 103. The control unit 10 operates in accordance with the control program stored in, for example, a hard disk drive (HDD) 81 to function as the controller 101, the print-job execution unit 102, and the postprocessing-position marking unit 103.

The controller 101 is connected to, for example, the document reading unit 5, the image processing unit 31, the image memory 32, the recording-sheet conveying unit 411, the image forming unit 12, the operation unit 47, and the HDD 81. The controller 101 controls the respective mechanisms described above, which are connected to the controller 101, and transmits and receives signals or data between the respective mechanisms.

The controller 101 controls driving and processes of respective mechanism units that are necessary to execute controls for the respective functions of the scanner function, the copy function, and the printer function, in accordance with an execution instruction on the job accepted via the operation unit 47 or similar unit from the operator. In particular, the controller 101 controls displaying on the display 473. The touch panel function of the display 473 accepts a touch operation of the operator relative to the display 473.

The controller 101 is connected to the postprocessing device 60. The postprocessing device 60 includes a control unit 610, an elevating unit 605, and a roller-driving unit 652. While the postprocessing device 60 includes the respective mechanisms described above, here respective units related to an elevation control of the discharge tray 623 will be described.

The control unit 610 is constituted of a CPU, a RAM, a ROM, a dedicated hardware circuit, and similar circuit. The control unit 610 includes the driving control unit 611 and a memory 612.

The driving control unit 611 manages the whole control of the postprocessing device 60. The driving control unit 611 cooperates with the controller 101 on the apparatus main body 11 side via communication to control operations of the respective mechanisms of the postprocessing device 60, or controls an operation mechanism such as the display 473 on the apparatus main body 11 side.

The roller-driving unit 652 is a power generation device such as a motor that imparts a rotary drive power to the discharge roller pair 607. The roller-driving unit 652 is drivingly controlled by the controller 101 and the driving control unit 611. The roller-driving unit 652 imparts the rotary drive power to other rollers such as the conveyance roller pairs 602 and 620.

The control unit 10 will be further described. The print-job execution unit 102 executes a print job. That is, the print-job execution unit 102 operates to control the paper sheet feeder 14, the image forming unit 12, the postprocessing device 60, and similar unit to cause them to perform printing in accordance with the print job.

In particular, when executing a print/postprocessing job that is a print job that prints a plurality of copies to perform the postprocessing for each of the copies, the print-job execution unit 102 executes trial printing. Specifically, the print-job execution unit 102, as the trial printing, causes the image forming unit 12 to print a first copy, and then executes an operation of temporarily halting the print/postprocessing jobs. At this time, the print-job execution unit 102 instructs the postprocessing device 60 not to perform the postprocessing on the first copy. Then, the operator confirms the contents of the printed matter of the first copy, and then places the printed matter on the platen 600 of the postprocessing device 60. After that, when the operation unit 47 accepts a print-job-resumption instruction from the operator, the print-job execution unit 102 instructs the postprocessing device 60 to perform the postprocessing on the printed matter of the first copy placed on the platen 600. After the postprocessing device 60 has performed the postprocessing on the printed matter of the first copy, the print-job execution unit 102 resumes the print/postprocessing jobs from the second copy. During the execution of the print/postprocessing jobs, the print-job execution unit 102 executes an ordinary print job, namely a print job associated with the postprocessing on the second and subsequent copies.

During the temporary halt of the print/postprocessing jobs, when the operation unit 47 accepts a change instruction on a postprocessing position from the operator, the print-job execution unit 102 changes the postprocessing position in the print/postprocessing jobs in accordance with the change instruction. This will be described later.

The postprocessing position marking unit 103 adds predetermined marks at each of a position on which the postprocessing is to be performed and a position on which the postprocessing can be performed, in image data in a head page of the first copy. Consequently, an execution of trial printing in the print/postprocessing jobs prints the marks at each of the position on which the postprocessing is to be performed and another position on which the postprocessing can be performed, in the head page of the first copy.

Figure 3:
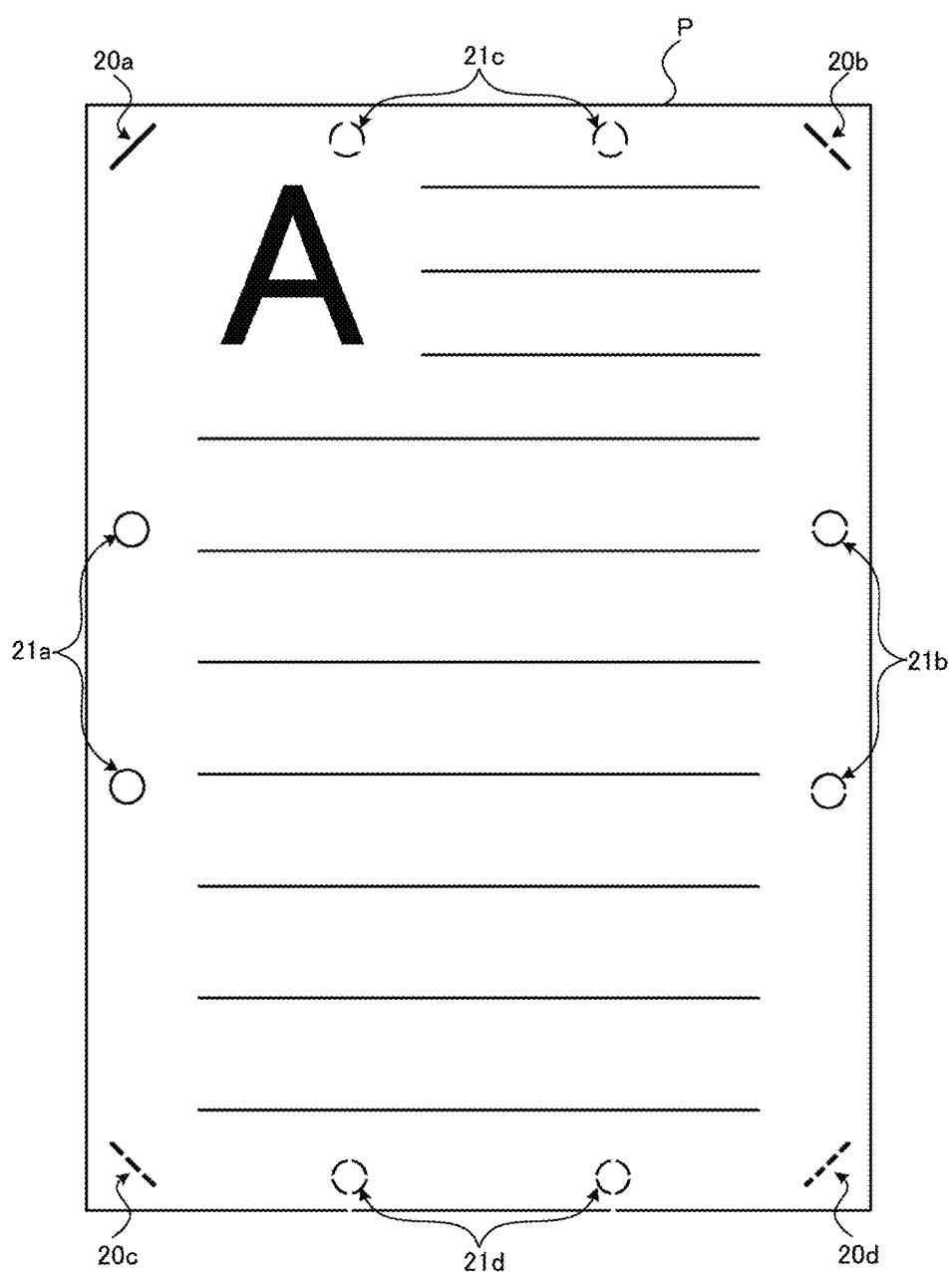
FIG. 3 illustrates a print example of a head page of a first copy on which trial printing is performed.

FIG. 3 illustrates a print example of the head page of the first copy on which the trial printing is performed. In the print/postprocessing jobs executed in the embodiment, assume that the postprocessing is set as follows: the staple processing is set at an upper left position of the recording sheet P in FIG. 3; and the punch processing is set on a left side portion of the recording sheet P. In this case, the postprocessing position marking unit 103, in the head page (recording sheet P), adds an image indicative of a mark 20$a$ indicating the position on which the staple processing is performed at the upper left position, adds an image indicative of a mark 21$a$ indicating the position on which the punch processing is performed in the left side portion, and then an image indicating the head page with the respective added mark images is printed (see FIG. 3). The mark 20$a$ is indicated by a solid-line segment having a length and a width similar to those of an actual staple, and the mark 21$a$ is indicated by two solid-line circles having a size similar to those of actual punched holes. This enables the operator to confirm whether the postprocessing is performed at intended positions or not by looking at the head page of the first copy on which the trial printing has been performed.

Further, in the head page (recording sheet P), the postprocessing position marking unit 103 adds the mark image also at another position on which the postprocessing can be performed, and the image indicative of the head page with each added mark image is printed (see FIG. 3). For example, the postprocessing position marking unit 103 adds marks 20$b$, 20$c$, and 20$d$ indicative of positions on which the staple processing can be performed, at respective positions of an upper right, a lower left, and a lower right of the recording sheet P in FIG. 3, respectively, and adds marks 21$b$, 21$c$, and 21$d$ indicative of positions on which the punch processing can be performed, in a right-side portion, a upper-end portion, and a lower-end portion of the recording sheet P, respectively. Then, an image indicative of the head page with the respective added mark images is printed (see FIG. 3). To differentiate from the marks 20$a$ and 21$a$, which indicate the positions on which the postprocessing is to be actually performed, for example, the images of the marks 20$b$ and 21$b$ are expressed with two line segments, the marks 20$c$ and 21$c$ with three line segments, and the marks 20$d$ and 21$d$ with four line segments. As described later, the operator can change or cancel the positions on which the staple processing and the punch processing are to be performed by the operation of the operation unit 47 after confirming the recording sheet P on which the trial printing has been performed.

Figure 4:
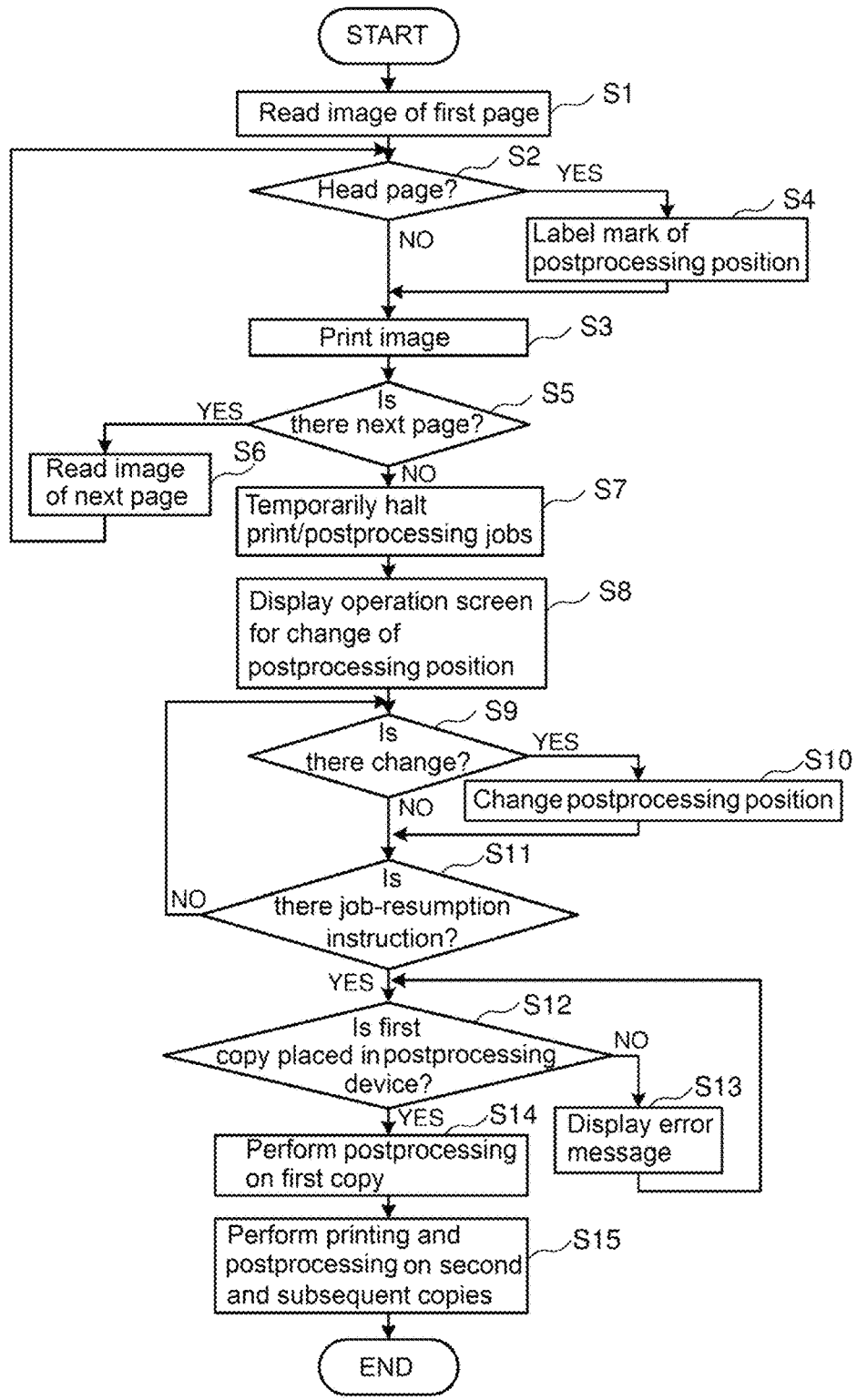
FIG. 4 illustrates a process when the image forming apparatus according to the one embodiment performs trial printing during execution of print/postprocessing jobs.

Next, the following describes a trial-printing process in the print/postprocessing jobs associated with the postprocessing by the image forming apparatus 1. FIG. 4 illustrates a process when the trial printing is performed during the execution of the print/postprocessing jobs by the image forming apparatus 1.

Assume that the print-job execution unit 102 starts the print/postprocessing jobs, which print a plurality of copies of print-target data. At this time, among the image data of the print target in the print/postprocessing jobs, the print-job execution unit 102 reads image data of the first page (Step S1), and determines whether the first page is the head page of a multi-page group indicated by print target data or not (Step S2). Here, the first page is a page to be discharged first after a printing process is performed. When the recording sheet P is discharged in a face-down manner, since the printing process is performed in order from the head page, the head page of the print-target data corresponds to the first page. On the other hand, when the recording sheet P is discharged in a face-up manner, since the printing process is performed in reverse order from the last page, the last page of the print-target data corresponds to the first page.

When the print-job execution unit 102 determines that the first page is not the head page (NO at Step S2), the controller 101 controls the image forming unit 12 and similar unit to print image data of the page on the recording sheet P (Step S3). On the other hand, when the print-job execution unit 102 determines that the first page is the head page of the print/postprocessing jobs (YES at Step S2), the postprocessing position marking unit 103 adds the above-described marks at the respective positions on which the postprocessing is to be performed and at another position on which the postprocessing can be performed, in the image data (Step S4). At this time, the postprocessing-position marking unit 103 adds the solid-line mark (such as the mark 20*a* or the mark 21*a* in FIG. 3) at the position on which the postprocessing is to be actually performed and, for other than those, adds dotted-line marks (such as the marks 20*b* to 20*d* or 21*b* to 21*d* in FIG. 3) at the positions on which the postprocessing can be performed. Then, the controller 101 controls the image forming unit 12 and similar units to print the image data with the added marks, on the recording sheet P (Step S3). In the print/postprocessing jobs, the postprocessing position marking unit 103 adds the mark 20*a* and the marks 20*b* to 20*d* when the stapling is performed as the postprocessing, and adds the mark 21*a* and the marks 21*b* to 21*d* when punching is performed as the postprocessing. Here, while the postprocessing position marking unit 103 adds the above-described marks only on the head page, it may also label the marks on another page.

A discharge destination of the recording sheet P after the image processing may be any one of the discharge tray 151 on the apparatus main body 11 side and the discharge tray 623 on the postprocessing device 60 side.

The print-job execution unit 102 determines whether there is the next page to print in the print/postprocessing jobs or not. When there is the next page (YES at Step S5), the print-job execution unit 102 reads image data of the next page (Step S6) and determines whether the next page is the head page of the print/postprocessing jobs or not (Step S2). Afterward, the print-job execution unit 102 repeats the above-described Steps S2 to S5 until a print job of all pages of the print/postprocessing jobs for the first copy terminates (NO at Step S5).

When the print job of all the pages of the first copy in the print/postprocessing jobs terminates, the print-job execution unit 102 temporarily halts the print/postprocessing jobs without performing the postprocessing on the printed matter of the first copy (Step S7). This enables the operator to confirm a position on which the postprocessing is to be performed on the actual recording sheet P, at an early point when the print job is started, by visually identifying the printed matter of the discharged first copy. When the print/postprocessing jobs temporarily is halted, the controller 101 causes the display 473 to display an operation screen for accepting a change of a postprocessing position (Step S8).

Figure 5:
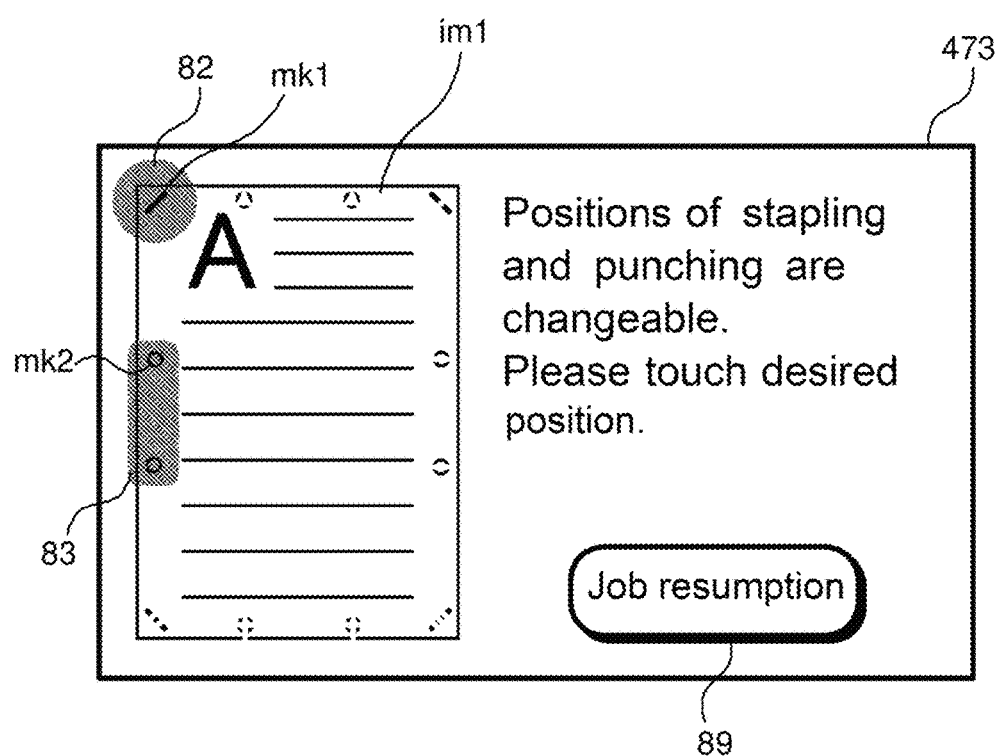
FIG. 5 illustrates an exemplary operation screen for accepting a change of a postprocessing position.

FIG. 5 illustrates an exemplary operation screen for accepting a change of a postprocessing position. As the example is illustrated in FIG. 5, for example, during the temporary halt of the print/postprocessing jobs, the controller 101 causes the display 473 to display an image im1 of the head page of the first copy. In the embodiment, the head page indicates an example where both of stapling and punching are performed as the postprocessing. At this time, the controller 101, in the image im1, causes a transmissive button 82 that is an image for accepting the operation from the operator to be superimposedly displayed on a mark mk1 that indicates a position on which the stapling is to be performed. The controller 101, in the image im1, causes a transmissive button 83 that is an image for accepting the operation from the operator to be superimposedly displayed on a mark mk2 that indicates a position on which the punching is to be performed.

Figure 6:
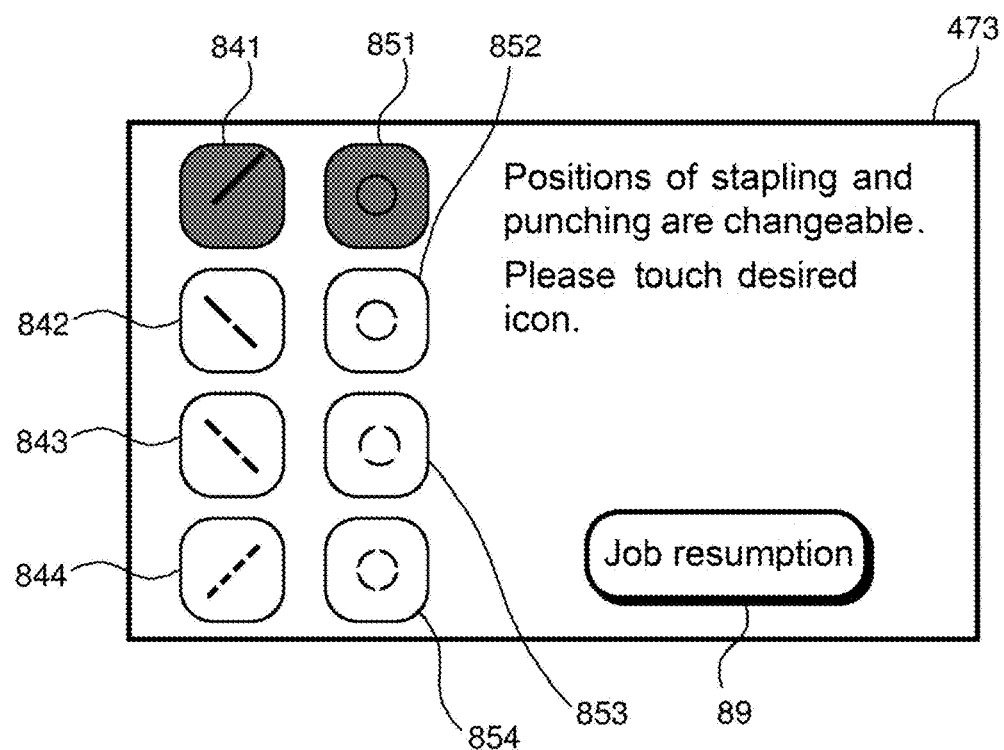
FIG. 6 illustrates another exemplary operation screen for accepting a change of a postprocessing position.

FIG. 6 illustrates another exemplary operation screen for accepting a change of a postprocessing position. For example, during the temporary halt of the print/postprocessing jobs, the controller 101 causes the display 473 to display icons 841 to 844 that correspond to the marks (see FIG. 3) indicative of staple positions printed on the head page of the first copy, and icons 851 to 854 that correspond to the marks (see FIG. 3) indicative of punch positions. At this time, the controller 101 highlights the icons 841 and 851 that correspond to the marks indicative of the positions on which the postprocessing is to be performed, in a display form different from the other icons to represent that those icons are selected.

Figure 7:
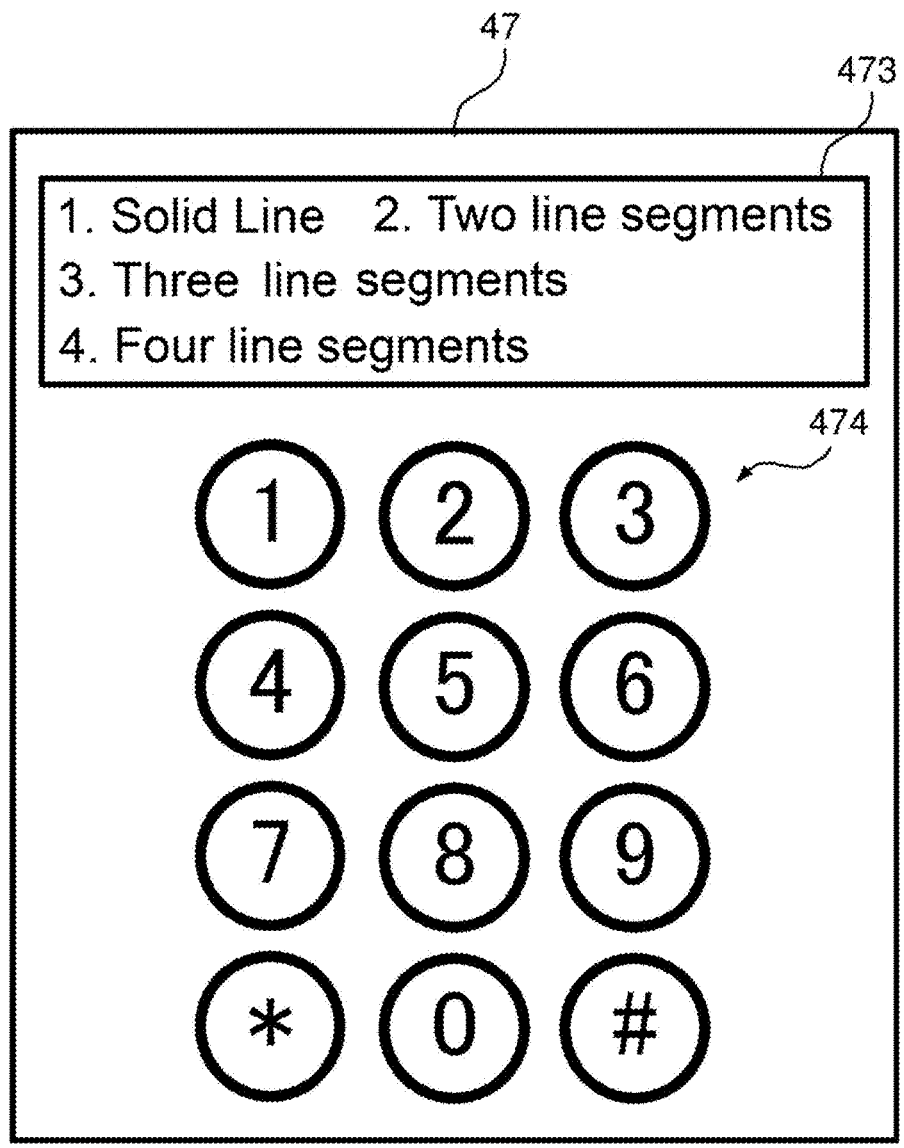
FIG. 7 illustrates yet another exemplary operation screen for accepting a change of a postprocessing position.

FIG. 7 illustrates yet another exemplary operation screen for accepting a change of a postprocessing position. For example, when the display 473 is a character display that cannot display an image, the controller 101 causes the display 473 to display respective numerals that correspond to the marks (see FIG. 3) printed on the head page of the first copy. At this time, the controller 101 causes the display 473 to display also a descriptive text, for example, "1. solid line," for each mark after each numeral.

Returning to FIG. 4, the controller 101 causes the display 473 to display the operation screen (any one of the operation screens illustrated in FIGS. 5 to 7) for accepting a change of a postprocessing position. For example, in the example of FIG. 5, when the controller 101 detects that a touch operation to any mark in the image, which is displayed by the display 473, is performed (YES at Step S9), the print-job execution unit 102 changes the postprocessing position in the print/postprocessing jobs to a postprocessing position indicated by the mark to which the controller 101 has detected the touch operation (Step S10).

Figure 8:
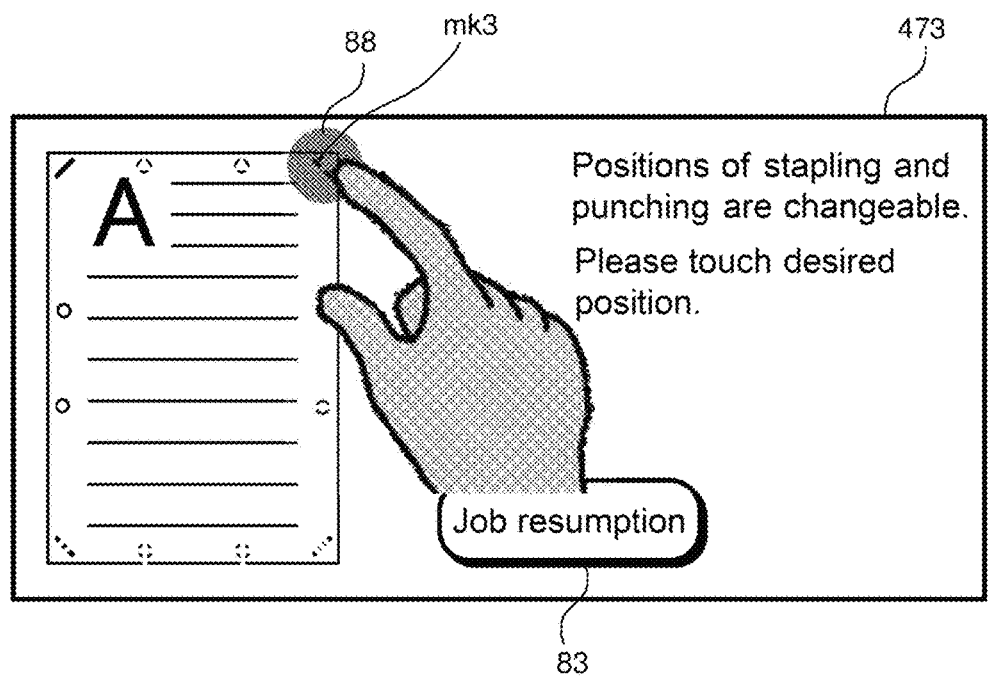
FIG. 8 illustrates a state where the operation screen according to the one embodiment is operated.

FIG. 8 illustrates a state where the operation screen illustrated in FIG. 5 is operated. For example, when the operator performs a touch operation to a mark mk3 indicative of a staple position in an upper right of the image, and the controller 101 detects the position of the touch operation by the touch panel function, the controller 101 causes a transmissive button 88 to be superimposedly displayed on the mark mk3. Based on the detection of the touch operation, the print-job execution unit 102 accepts the instruction of changing the postprocessing position from the position that the mark mk1 indicates to the position that the mark mk3, which is the position on which the touch operation has been performed, indicates.

When the operator performs the touch operation on the transmissive buttons 82 and 83, and the controller 101 detects the position of the touch operation by the touch panel function, based on the detection of the touch operation, the print-job execution unit 102 accepts a cancel instruction of the postprocessing at the position that the mark, which is the position on which the touch operation has been performed, indicates. FIG. 8 illustrates an example where the punch processing on a left side of a recording sheet is cancelled.

In the example in FIG. 6, when the controller 101 detects that the touch operation has been performed to any one of the icons 841 to 844 and 851 to 854 displayed in the display 473 (YES at Step S9), the print-job execution unit 102 changes the postprocessing position in the print/postprocessing jobs to the postprocessing position that corresponds to the icon to which the controller 101 has detected the touch operation (Step S10).

In the example in FIG. 7, when the controller 101 detects that any one of numeric keys 474 arranged on the operation unit 47 has been pressed (YES at Step S9), the print-job execution unit 102 changes the postprocessing position in the print/postprocessing jobs to a postprocessing position that corresponds to the numeric key 474 to which the controller 101 has detected the press (Step S10).

Returning to the description with reference to FIG. 4. After the operation screen is displayed (Step S8), the print-job execution unit 102 waits a print-job-resumption instruction from the operator. For example, when the controller 101 detects that the touch operation has been performed on a job-resumption button 89 illustrated in FIGS. 5 and 6 by the touch panel function (YES at Step S11), the print-job execution unit 102 resumes the print/postprocessing jobs, which has been halted temporarily. In the example in FIG. 7, when the controller 101 detects that a start button (not illustrated) as part of the operation unit 47 has been pressed (YES at Step S11), the print-job execution unit 102 resumes the print/postprocessing jobs, which has been halted temporarily. When there has not been the print-job-resumption instruction (NO at Step S11), the process at Step S9 is performed.

When resuming the print/postprocessing jobs, the print-job execution unit 102 first determines whether the document, namely the printed matter of the first copy, on which the trial printing has been performed, is placed on the platen 600 of the postprocessing device 60 or not (Step S12). For example, based on an output from a paper-sheet detection sensor (not illustrated) located in the platen 600, the print-job execution unit 102 determines presence or absence of loading of the printed matter of the first copy on the platen 600.

When determining that the document is not placed on the platen 600 (NO at Step S12), the print-job execution unit 102 causes the controller 101 and the display 473 to display a message indicating an error (Step S13). This prompts the operator to place the printed matter of the first copy, on which the trial printing has been performed, on the platen 600. After Step S13, the process returns to Step S12.

On the other hand, when the print-job execution unit 102 determines that the document is placed on the platen 600 (YES at Step S12), the print-job execution unit 102 causes the postprocessing device 60 to perform the postprocessing on the document placed on the platen 600 (Step S14). This performs the postprocessing to the printed matter of the first copy, on which the trial printing has been performed, and the print-job execution unit 102 causes the printed matter of the first copy, on which the postprocessing has been performed, to be discharged to the discharge tray 623 in the postprocessing device 60.

After that, the print-job execution unit 102 performs the print job on the second and subsequent copies (Step S15). Regarding the second and subsequent copies, the print-job execution unit 102 also performs the postprocessing following the printing process without temporarily halting the print job.

Accordingly, the above-described embodiment, in the print job associated with the postprocessing such as the staple processing and the punch processing, first performs the trial printing on the first copy and prints the predetermined mark at the position on which the postprocessing is to be performed in the head page. This enables the operator to confirm the position on which the postprocessing is to be performed on the actual recording sheet P, at an early point when the print job is started. Then, returning the printed matter of the first copy, on which the trial printing is performed, to the platen 600 of the postprocessing device 60 enables performing the postprocessing on the first copy. This enables confirming the position on which the postprocessing is to be performed on the actual recording sheet P by the trial printing, at an early point when the print job is started, and further enables use of the recording sheet P used for the trial printing as a final product, without wasting the recording sheet P. Further, it is possible to change the position of the postprocessing to an intended position by a simple operation.

While the embodiment of the disclosure has been described, the disclosure is not limited to the configuration of the above-described embodiment, and various modifications are possible. For example, while in the embodiment the multi-functional peripheral is employed as one embodiment of the image forming apparatus according to the disclosure to describe the embodiment, this is merely one example, and other electronic devices, for example, other image forming apparatuses such as a printer, a copying machine, and a facsimile device are also applicable. The postprocessing is not limited to the staple processing and the punch processing, and another postprocessing is applicable.

The configurations indicated by the embodiments by using FIGS. 1 to 8 are merely one embodiment of the disclosure, and it is not meant to limit the disclosure to the configurations.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
   a processor;
   a storage unit storing a control program;
   a paper sheet feeder that feeds recording sheets from a sheet feed cassette;
   an image forming unit that performs image formation on the recording sheets fed from the paper sheet feeder; and
   a postprocessing unit that performs postprocessing, being at least one of either staple processing with staples of predetermined length and width on the recording sheets, or punch processing to form holes of predetermined size in the recording sheets, following image formation by the image forming unit; wherein
   by the processor operating in accordance with the control program, the image forming apparatus functions as a control unit, a print-job execution unit, and a postprocessing-position marking unit, the print-job execution unit, in accordance with a print job, performs operational control on the paper sheet feeder, the image forming unit, and the postprocessing unit to cause the paper sheet feeder, the image forming unit, and the postprocessing unit to perform printing, when a print/postprocessing job in which a plurality of copy sets is printed and the postprocessing is performed on each copy set is executed by the print-job execution unit, the postprocessing-position marking unit labels image data for at least the head page of the first copy set with predetermined marks indicating either stapling or punching, respectively in a position where the postprocessing is to be performed and in a position where the postprocessing is performable, and the print-job execution unit, when executing the print/postprocessing job, performs control so that the first copy set is printed without the postprocessing, the image data in which at least the head page has been labeled with the predetermined marks is printed out, and the print/postprocessing job is temporarily halted.

2. The image forming apparatus according to claim 1, further comprising:
an operation unit that accepts a print instruction from an operator; wherein
during execution of the print/postprocessing job, when printed matter for the first copy set is placed in the postprocessing unit, and the operation unit accepts a job-resumption instruction from the operator, the print-job execution unit causes the postprocessing unit to perform the postprocessing on the printed matter for the first copy set, and resumes the print/postprocessing job from the second copy set onward.

3. The image forming apparatus according to claim 2, wherein, during a temporary halt of the print/postprocessing job, when the operation unit accepts an instruction for changing a postprocessing position, the print-job execution unit changes the postprocessing position in the print/postprocessing job in accordance with the change instruction.

4. The image forming apparatus according to claim 3, further comprising:
a display in a form of a touchscreen; wherein
the control unit controls image-display operation by the display;
the operation unit accepts touch operations by the operator with respect to the display; and
while the control unit causes the display to display an image indicative of the head page of the first copy set during the temporary halt of the print/postprocessing job, and when the operation unit detects that a touch operation has been performed on any of the marks in the image, the print-job execution unit changes the postprocessing position in the print/postprocessing job to a postprocessing position corresponding to the mark for which the touch operation has been detected.

5. The image forming apparatus according to claim 3, further comprising:
a display in a form of a touchscreen; wherein
the control unit controls image-display operation by the display;
the operation unit accepts touch operations by the operator with respect to the display; and
when the control unit causes the display to display respective icons that correspond to the marks printed on the head page of the first copy set during the temporary halt of the print/postprocessing job and the operation unit detects that a touch operation has been performed on any of the icons, the print-job execution unit changes the postprocessing position in the print/postprocessing job to a postprocessing position corresponding to the icon for which the touch operation has been detected.

6. The image forming apparatus according to claim 3, further comprising:
a display; wherein
the control unit that controls an image-display operation by the display;
the operation unit includes numeric keys;
the control unit causes the display to display respective numerals that correspond to the marks printed on the head page of the first copy set during the temporary halt of the print/postprocessing job and the operation unit detects that any of the numeric keys has been pressed; and
the print-job execution unit changes the postprocessing position in the print/postprocessing job to a postprocessing position corresponding to the numeric key for which pressing has been detected by the operation unit.

7. The image forming apparatus according to claim 1, wherein the mark indicating stapling is a staple-line segment of length and width that is approximately the same as that of the staple-processing staples, and the mark indicating punching is a plurality of punch-circles of size that is approximately the same as that of the punch-processing holes.

8. The image forming apparatus according to claim 7, wherein the staple-line segment and the punch-circles are rendered solid-line marks in locations where the postprocessing is to be performed and are labeled as dashed-line marks in locations where the postprocessing is performable.

9. An image forming apparatus comprising:
a processor;
a storage unit storing a control program;
a paper sheet feeder that feeds recording sheets from a sheet feed cassette;
an image forming unit that performs image formation on the recording sheets fed from the paper sheet feeder;
a postprocessing unit that includes a document platen for carrying postprocessing printed matter and that performs postprocessing, being at least one of either staple processing or punch processing, either on printed matter placed on the document platen, or on the recording sheets following image formation by the image forming unit; and
an operation unit that accepts a print instruction from an operator; wherein
by the processor operating in accordance with the control program, the image forming apparatus functions as a control unit, a print-job execution unit, and a postprocessing-position marking unit, the print-job execution unit, in accordance with a print job, performs operational control on the paper sheet feeder, the image forming unit, and the postprocessing unit to cause the paper sheet feeder, the image forming unit, and the postprocessing unit to perform printing, when a print/postprocessing job in which a plurality of copy sets is printed and the postprocessing is performed on each copy set is executed by the print-job execution unit, the postprocessing-position marking unit labels image data for at least the head page of the first copy set with predetermined marks indicating either stapling or punching, respectively in a position where the postprocessing is to be performed and in a position where the postprocessing is performable, the print-job execution unit, when executing the print/postprocessing job, performs control so that the first copy set is printed without the postprocessing, the image data in which at least the head page has been labeled with the predetermined marks is printed out, and the print/postprocessing job is temporarily halted, and during temporary halting of the print/postprocessing job, when printed matter for the first copy set is placed on the document platen in the postprocessing unit, and the operation unit accepts a job-resumption instruction from the operator, the print-job execution unit causes the postprocessing unit to perform the postprocessing on the printed matter for the first copy set placed on the document platen, and resumes the print/postprocessing job on the recording sheets fed from the paper sheet feeder.

10. The image forming apparatus according to claim 9, further comprising:

a display in a form of a touchscreen, wherein the control unit controls image-display operation by the display; and a paper-sheet detection sensor provided on the document platen in the postprocessing unit; wherein when a job-resumption instruction is accepted by the operation unit, if the paper-sheet detection sensor detects paper-sheet absence, the print-job execution unit causes the control unit and the display to display an error indication and does not resume the print/postprocessing job.

* * * * *